US007827257B2

(12) United States Patent
Chu et al.

(10) Patent No.: US 7,827,257 B2
(45) Date of Patent: Nov. 2, 2010

(54) SYSTEM AND METHOD FOR AUTOMATIC AND ADAPTIVE USE OF ACTIVE NETWORK PERFORMANCE MEASUREMENT TECHNIQUES TO FIND THE FASTEST SOURCE

(75) Inventors: Jim Chu, Beaverton, OR (US); Frank T. Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 09/884,674

(22) Filed: Jun. 19, 2001

(65) Prior Publication Data

US 2002/0194310 A1 Dec. 19, 2002

(51) Int. Cl.
G06F 15/173 (2006.01)
G06F 15/16 (2006.01)
(52) U.S. Cl. .................. 709/223; 709/224; 709/201
(58) Field of Classification Search .......... 709/223, 709/227, 200, 241, 201; 707/2; 725/13; 395/200.63
See application file for complete search history.

(56) References Cited

U.S. PATENT DOCUMENTS

| 5,913,041 | A  | * | 6/1999 | Ramanathan et al. | ....... 709/233 |
| 6,304,913 | B1 | * | 10/2001 | Rune | ....... 709/241 |
| 6,457,054 | B1 | * | 9/2002 | Bakshi | ....... 709/227 |
| 6,477,522 | B1 | * | 11/2002 | Young | ....... 707/2 |
| 6,563,517 | B1 | * | 5/2003 | Bhagwat et al. | ....... 715/735 |
| 6,606,643 | B1 | * | 8/2003 | Emens et al. | ....... 709/203 |
| 7,139,815 | B2 | * | 11/2006 | Muti et al. | ....... 709/219 |
| 2002/0038360 | A1 | * | 3/2002 | Andrews et al. | ....... 709/223 |
| 2002/0116444 | A1 | * | 8/2002 | Chaudhri et al. | ....... 709/201 |
| 2002/0120727 | A1 | * | 8/2002 | Curley et al. | ....... 709/223 |
| 2002/0133816 | A1 | * | 9/2002 | Greene et al. | ....... 725/13 |
| 2002/0143918 | A1 | * | 10/2002 | Soles et al. | ....... 709/223 |
| 2003/0079005 | A1 | * | 4/2003 | Myers et al. | ....... 709/223 |

OTHER PUBLICATIONS

"Characterizing End-to-End Performance, A VitalSoft Whitepaper", *Lucent Technologies NetworkCare*, Copyright 2000, 1-22, (2000).
Clarke, I., "A Distributed Decentralised Information Storage and Retrieval System", *Division of Informatics*, University of Edinburg, 1999, 1-43, (1999).
Crovella, M.E., et al., "Dynamic Server Selection in the Internet", *In Proc. of the Third IEEE Workshop on the Architecture and Implementation of High Performance Communication Subsystems (HPCS' 95)*, 1-5, (Jun. 30, 1995).

\* cited by examiner

*Primary Examiner*—Philip C Lee
(74) *Attorney, Agent, or Firm*—Schwegman, Lundberg & Woessner, P.A.

(57) ABSTRACT

Systems and methods are provided through which automatic and adaptive use of active network performance measurement techniques identifies a fastest download source. Before a download source is selected, empirical measurements of the download speed are performed. For small files, the first source to acknowledge an open socket connection is used as an indication of the fastest download source. For large files, a download test is performed as the empirical measurement to determine the fastest download source.

27 Claims, 11 Drawing Sheets

SYSTEM AND METHOD FOR AUTOMATIC AND ADAPTIVE USE OF ACTIVE NETWORK PERFORMANCE MEASUREMENT TECHNIQUES TO FIND THE FASTEST SOURCE

TECHNICAL FIELD OF THE INVENTION

The present invention relates to optimizing download performance from either a client-server based or peer-to-peer type network.

BACKGROUND OF THE INVENTION

Search engines, such as Google, and Peer-to-Peer (P2P) services, such as Napster, gnutella, and Freenet, have made locating files and information on the Internet very easy. However, with tens of millions of computers coupled to the Internet, often there are several sources from which to download any particular file. However, the user has no automatic or adaptive means through which to select the source that will download the entire file in the least amount of time.

In some conventional P2P applications, each file that is available to be downloaded is associated with an indicated download throughput speed of the communication link of the source computer on which the file is stored. However, the associated throughput speed is not reliable information because the throughput speed is manually specified by a user operating the computer on which the file is stored from the user's knowledge of the optimal throughput speed. In addition, the associated throughput speed is not reliable information because even when the user correctly specifies or indicates the throughput speed of the communication link of the source computer on which the file is stored, on occasion, the throughput speed varies according to changing conditions of the communication link. The changing conditions include changes in the network load and the network capacity. Furthermore, the time it takes to obtain a file does not correlate well with how far the source computer is in terms of network hops or how fast it responds to a network Ping. Thus, these metrics are unreliable in determining the fastest source.

When another user is selecting a source from which to download a particular file through the P2P service, often, one of the more important criteria in selecting a source is the throughput speed of the communication link of the computer on which the file is stored. The other user has no ability to automatically and adaptively confirm, verify, test or measure the indicated throughput speed. As a result, the other user must trust the accuracy of the indicated throughput speed. In addition, the other user must manually select a computer from which to download data, which introduces the possibility that the other user may mis-read the indicated throughput speed. Moreover, in conventional P2P networks, the other user often selects the same source to download from when a previous download has been successful, and in which the other user is also unknowledgeable there is another source with better performance.

As a result of the many possible reasons that the indicated throughput speed may vary from the actual throughput speed, there is very little correlation between the specified throughput speed and the actual throughput speed as shown in FIG. 16.

In addition, in conventional P2P methods, after a download is started, the download continues until the download is completed or until the download times out. There is no active monitoring of performance and the end user must manually select a new source if the initial download does not complete, or progresses slower than the user desires.

Furthermore, conventional systems do not discriminate or distinguish between large and small files. Also, other technologies, such as Akamai Technologies Inc. that offer edge services that cache data at the network edge so users don't have to go all the way to the actual server for the data, do not adapt to changing network conditions, they rely on a known static network topology.

A software product named VitalAgent from Lucent Technologies measures end-to-end network performance. VitalAgent provides measurement techniques to test for latency and packet loss, such as estimates of round-trip time (RTT), in which the time between an acknowledgment (ACK) message and a synchronous idle (SYN) message is measured during a Transmission Control Protocol (TCP) socket establishment. An important assumption in VitalAgent is that very little time is required by a computer to respond to the SYN packet and that most of the delay is a result of network latency, rather than server side delays.

A research paper titled "Dynamic Server Selection in the Internet" by Mark E. Crovella and Robert L. Carter describes how to find a "good" service provider for WWW documents based on RTT latency. Their research shows that the number of hops does not correlate with RTT latency. However, Crovella and Carter do not use network throughput or packet loss in their determination of a "good" service provider and they do not implement their findings in an algorithmic method. Crovella and Carter merely disclose that latency is a "good" metric to use. In addition, Crovella and Carter address worldwide web (WWW) documents, and do not address P2P issues.

Furthermore, FreeNet implements a P2P technology that uses distributive storage or caching technology similar to Akamai. FreeNet is a large-scale peer-to-peer network which pools the power of member computers around the world to create a massive virtual information store open to anyone to freely publish or view information of all kinds. Freenet is an enhanced Open Source implementation of the system described by Ian Clarke's 1999 paper "A distributed decentralized information storage and retrieval system." However, FreeNet does not assist the end user find a faster source. FreeNet's storage and caching technology is adaptive after several attempts from different people to acquire the data, not adaptive to changing network conditions or transaction type.

For the reasons stated above, and for other reasons stated below which will become apparent to those skilled in the art upon reading and understanding the present specification, there is a need in the art for the ability to automatically and adaptively confirm, verify, test or measure the indicated performance of the source. There is also a need for the ability to automatically select the download source having the fastest throughput speed. Furthermore, there is a need to adapt the selection process according to the size of the file to be downloaded. Moreover, there is a need to actively monitor performance during the download.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The detailed description is divided into five sections. In the first section, the hardware and the operating environment in conjunction with which embodiments of the invention may be practiced are described. In the second section, a system level overview of the invention is presented. In the third section, methods for an embodiment of the invention are provided. In the fourth section, apparatus for an embodiment of the invention are provided. Finally, in the fifth section, a particular TCP/IP-based implementation of the invention is described.

A system and method for automatic and adaptive use of active network performance measurement techniques to find the fastest source is described herein.

Hardware and Operating Environment

Figure 1:
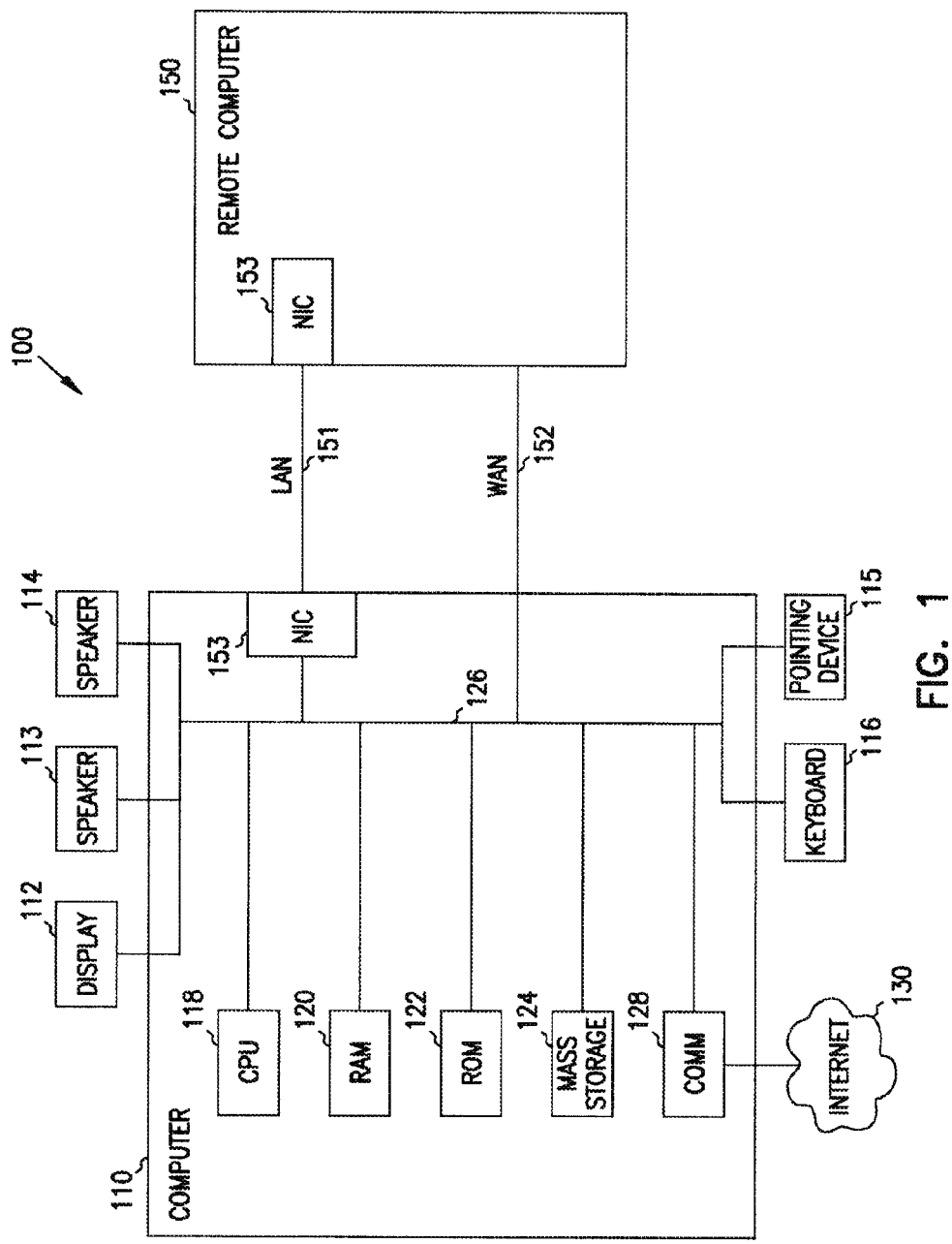
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of computer hardware and a suitable computing environment in conjunction with which some embodiments of the present invention can be implemented. Embodiments of the present invention are described in terms of a computer executing computer-executable instructions. However, some embodiments of the present invention can be implemented entirely in computer hardware, for instance on the network card but not limited to the network card, in which the computer-executable instructions are implemented in read-only memory. One embodiment of the invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118, commercially available from Intel®, random-access memory (RAM) 120, read-only memory (ROM) 122, and one or more mass storage devices 124, and a system bus 126, that operatively couples various system components including the system memory to the processing unit 118. Mass storage devices 124 are more specifically types of nonvolatile storage media and can include a hard disk drive, a floppy disk drive, an optical disk drive, and a tape cartridge drive. The memory 120, 122, and mass storage devices, 124, are types of non-transitory computer-readable media. A user enters commands and information into the computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. Embodiments of the present invention are not limited to any type of computer 110. In varying embodiments, computer 110 comprises a PC-compatible computer, a MacOS®-compatible computer or a UNIX®-compatible computer. The construction and operation of such computers are well known within the art.

Furthermore, computer 110 can be communicatively connected to the Internet 130 via a communication device 128. Internet 130 connectivity is well known within the art. In one embodiment, a communication device 128 is a modem that responds to communication drivers to connect to the Internet via what is known in the art as a "dial-up connection." In another embodiment, a communication device 128 is an Ethernet® or similar hardware (network) card connected to a local-area network (LAN) that itself is connected to the Internet via what is known in the art as a "direct connection" (e.g., T1 line, etc.).

Computer 110 can be operated using at least one operating environment to provide a graphical user interface including a user-controllable pointer. Such operating environments include operating systems such as versions of the Microsoft Windows® and Apple MacOS® operating systems well known in the art. Embodiments of the present invention are not limited to any particular operating environment, however, and the construction and use of such operating environments are well known within the art. Computer 110 can have at least one web browser application program executing within at least one operating environment, to permit users of computer 110 to access intranet or Internet world-wide-web pages as addressed by Universal Resource Locator (URL) addresses. Such browser application programs include Netscape Navigator® and Microsoft Internet Explorer®.

Display device 112 permits the display of information, including computer, video and other information, for viewing by a user of the computer. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126. In addition to a monitor, computers typically include other peripheral input/output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows®. Embodiments of the present invention are not limited to any particular pointing device 115. Such pointing devices include mouses, touch pads, trackballs, remote controls and point sticks. Finally, keyboard 116 permits entry of textual information into computer 110, as known within the art, and embodiments of the present invention are not limited to any particular type of keyboard.

The computer 110 can operate in a networked environment using logical connections to one or more remote computers, such as remote computer 150. These logical connections are achieved by a communication device coupled to, or a part of, the computer 110. Embodiments of the present invention are not limited to a particular type of communications device. The remote computer 150 can be another computer, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the computer 110, or portions thereof, can be stored in the remote memory storage device.

System Level Overview

Figure 2:
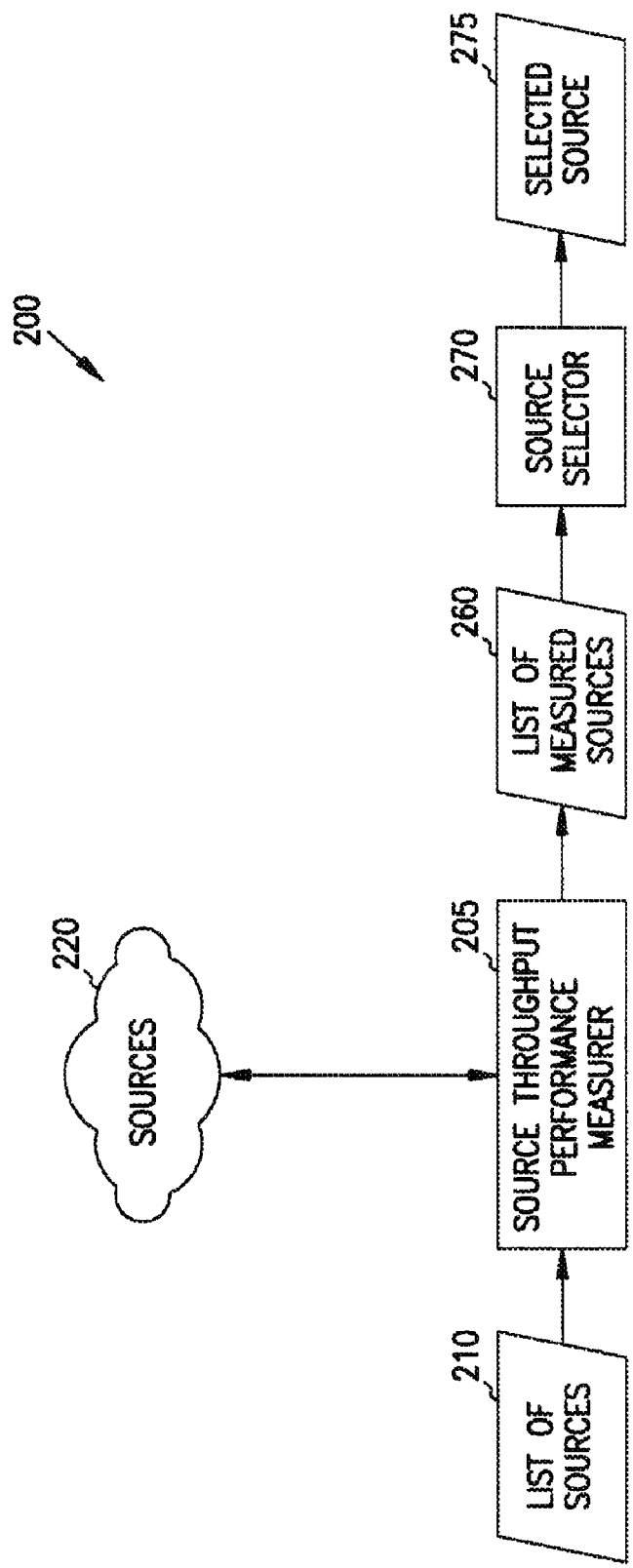
FIG. 2 is a diagram illustrating a system-level overview of an embodiment of the invention.

FIG. 2 is a block diagram that provides a system level overview of the operation of illustrated embodiments of the present invention. Embodiments of the invention are described as operating in a multi-processing, multi-threaded operating environment on a computer, such as computer 110 in FIG. 1.

System 200 includes a source throughput performance measurer 205. In one embodiment, the throughput performance measurer 205 is a source latency measurer (not shown). The source throughput performance measurer 205 receives a list of sources 210. The list of sources 210 identifies sources 220 that have been identified as sources of a data file (not shown). The data file is identical on each of the sources. The source throughput performance measurer 205 transmits data to the sources 220. Each source responds by transmitting a response. The source throughput performance measurer 205 receives the responses, and measures the elapsed time between the transmittal of the data, and corresponding response. The list of sources 210 is modified to indicate the performance measurements, yielding a list of measured sources 260. The source throughput performance measurer 205 enables the ability to confirm, verify, test or measure the associated speed of download sources. The list of measured sources 260 is then transmitted to a source selector 270 that selects a source 275 from the list of measured sources 260 in reference to the performance measurements. The source selector 270 selecting a source 275 from the list of measured sources 260 in reference to the performance measurements enables system 200 to automatically select the download source having the fastest throughput speed.

A downloader (not shown) initiates a download of the data file from the source indicated by the selected source 275.

The system level overview of the operation of an embodiment of the invention has been described in this section of the detailed description. The present invention is a system and method for automatic and adaptive use of active network performance measurement techniques to find the fastest source. While the invention is not limited to any particular downloader, for sake of clarity a simplified source throughput performance measurer 205, list of sources 210, sources 220, list of measured sources 260, source selector 270, have been described.

Methods of an Embodiment of the Invention

In the previous section, a system level overview of the operation of an embodiment of the invention was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients (the processor of the clients executing the instructions from computer-readable media). Similarly, the methods performed by the server computer programs, firmware, or hardware are also composed of computer-executable instructions. Methods 300-800 are performed by a client program executing on, or performed by firmware or hardware that is a part of, a computer, such as computer 110 in FIG. 1.

Figure 3:
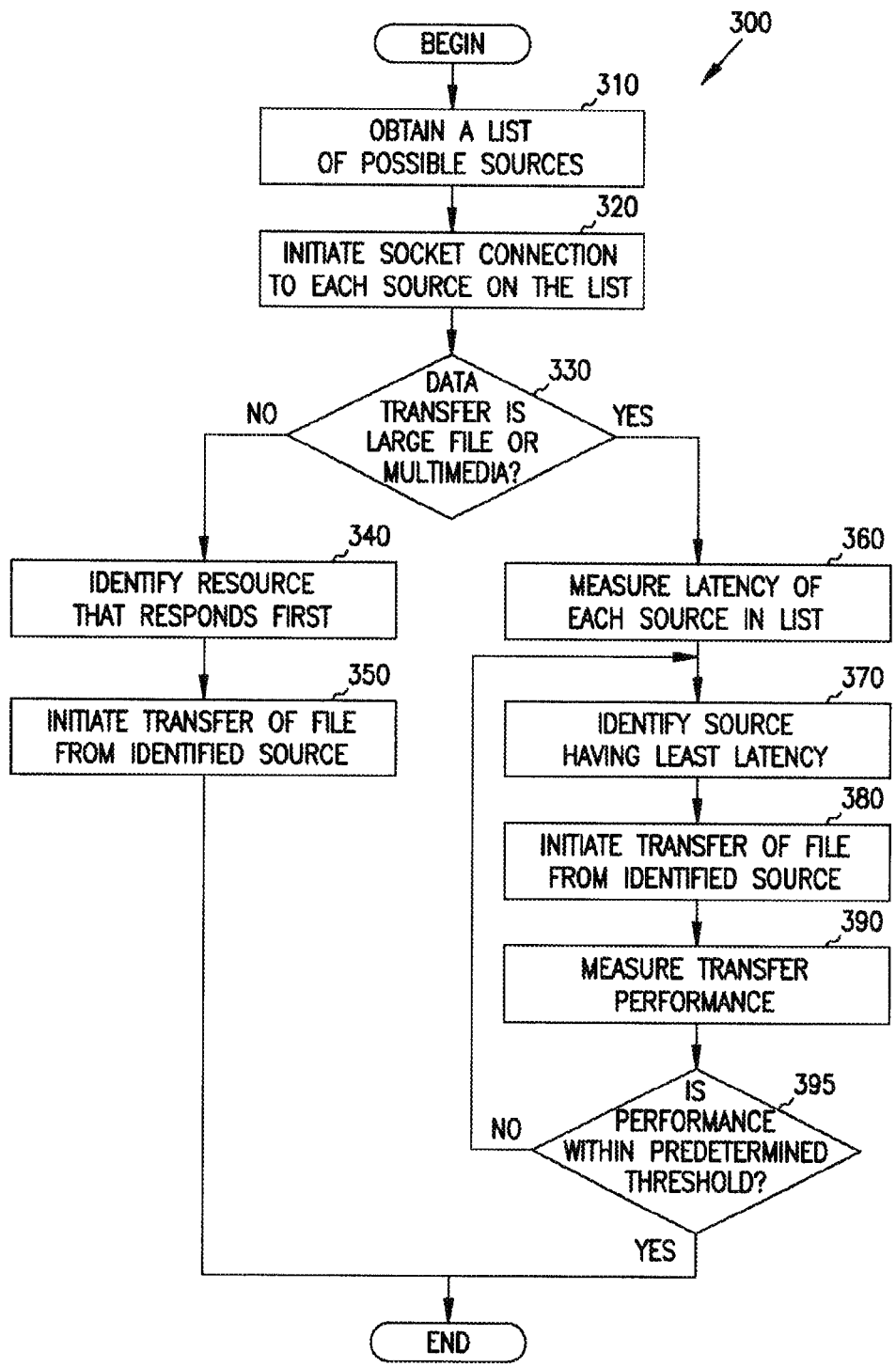
FIG. 3 is a flowchart of a method for managing a plurality of download sources, performed by a client according to an embodiment of the invention.

FIG. 3 is a flowchart of a method 300 for managing a plurality of download sources, performed by a client according to an embodiment of the invention.

Method 300 includes obtaining 310 a list of possible sources. In one embodiment, the list is obtained from a peer-to-peer client program that has previously submitted a request for a list of sources of a particular file. Action 310 obtains the list in response to the request. One example of a peer-to-peer client program is the Napster client. In the operation of the Napster client, the user identifies the criteria for files. The criteria includes artist name and/or title of composition. The Napster client generates a request for files matching the criteria, the Napster client transmits the request to a centralized database server, which identifies the matching files, and transmits the list of possible sources for files that match the criteria.

Subsequently, method 300 also includes establishing 320 a socket connection to each source in the list. One example of establishing a socket connection is opening a socket with the connect( ) function call from the winsock32 API.

Thereafter, method 300 includes determining 330 the type of data transfer transaction of the file. Through the action of determining the type of data transfer 330, method 300 enables adaptation of the selection process according to the size of the file to be downloaded.

If the result of the determining 330 indicates that the type of data transfer is in reference to a small file or resource sharing, then the first source that responds to the establishment of a socket connection is identified 340, and the data transfer of the file from the identified source is initiated 350. Through the action of identifying 340 the first source that responds to the establishment of a socket connection, method 300 enable automatic selection of the download source having the lowest latency or round-trip time (RTT).

If the result of the determining 330 indicates that the type of data transfer is in reference to a large file or multimedia data, then the latency of each of the source in the list is measured 360, and the source associated with the least latency is identified 370. One example of the measure of the latency is the RTT as the difference between a synchronous idle (SYN) message and an acknowledgment (ACK) message. Other examples of the measuring 360 include confirming verifying and/or testing. Through the action of measuring 360 the latency of each source, method 300 enables confirming, verifying, testing or measuring the associated speed of download sources. In one example of identifying 370 the source associated with the least latency, the list is sorted in order of length of latency. Through the action of identifying 370 the source having the least latency, method 300 enables automatic selection of the download source having the fastest throughput speed.

In one embodiment of actions 340 and 370, where a source is identified, the identification includes an Internet Protocol (IP) address. In yet another embodiment of actions 340 and 370, the identification is a uniform resource locator (URL).

Thereafter, method 300 includes initiating a transfer of the file from the identified source 380. During the transfer, performance of the transfer is measured 390. In one embodiment, the performance of transfer of large files is measured in regards to throughput. In another embodiment, the performance of multimedia data is measured in regards to data integrity, such as packet loss. Thereafter, the measurement of performance is compared 395 to a predetermined threshold value. If the measurement of performance falls below the predetermined threshold value, the method continues with identifying the source associated with the least latency 370. Otherwise, the transfer completes. Action 390 enables active monitor of performance during the download. Action 395 enables adaptive compensation for dynamic network performance.

Figure 4:
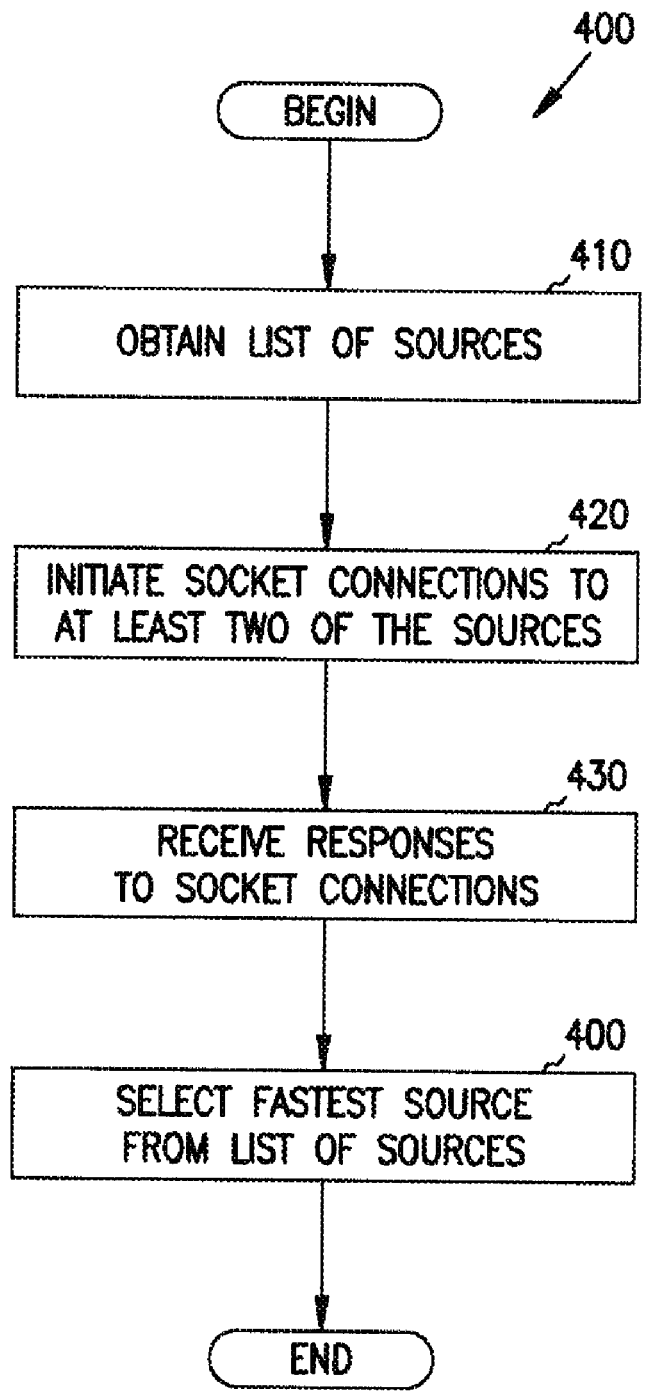
FIG. 4 is a flowchart of a method for managing a plurality of download sources, performed by a client according to an embodiment of the invention.

FIG. 4 is a flowchart of a method 400 for managing a plurality of download sources, performed by a client according to an embodiment of the invention.

Method 400 includes obtaining 410 a list comprising a plurality of identification of sources. In one embodiment, sources include source-1 1015, source-2 1020, and source-n 1025 in FIG. 10. In another embodiment, identification of the sources includes an Internet Protocol (IP) address. In yet another embodiment, identification is a uniform resource locator (URL). In still another embodiment, the sources are obtained from the list of sources 210 in FIG. 2 and the list of sources 1010 in FIG. 10.

Thereafter, method 400 includes initiating 420 a plurality of socket connections. The plurality of socket connections include one socket connection for each of the plurality of sources, yielding a plurality of initiated socket connections. One example of an initiated socket connection is a SYN message. The destination address used in the socket connection is the identification obtained in action 410.

In yet another embodiment of method 400, the throughput speed is a download speed.

Subsequently, method 400 includes receiving 430 a response for the each of the plurality of initiated socket connections. The receiving 430 yields a plurality of responses. One example of a response is an ACK message.

In varying embodiments, the fastest source of the plurality of sources is selected 440 in reference to a predetermined file size and in reference to the response, as disclosed below in FIGS. 5 and 6. The action of selecting 440 the first source that responds to the establishment of a socket connection enables method 400 to confirm, verify, test or measure the associated speed of download sources, and to automatically select the download source having the fastest throughput speed.

Figure 5:
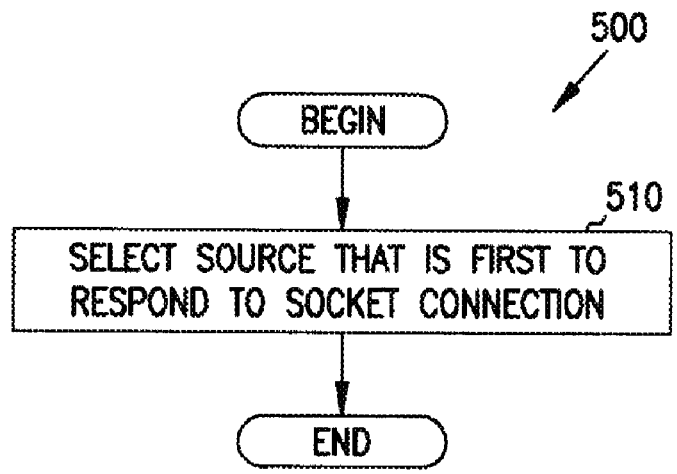
FIG. 5 is a flowchart of a method for selecting one of a plurality of download sources, as in FIG. 4, in which a predetermined file size is less than a predetermined threshold file size, performed by a client according to an embodiment of the invention.

FIG. 5 is a flowchart of a method 500 for selecting one of a plurality of download sources, as in action 440 in FIG. 4, in which a predetermined file size is less than a predetermined threshold file size, performed by a client according to an embodiment of the invention. In general, the threshold file size that distinguishes small files from large files can be based on the available bandwidth of the user requesting the file. For example, for a client computer that has a 56 Kbps modem, the threshold is approximately 560 K bits or 70 K bytes because transmission of that file would transpire in approximately ten seconds. In another embodiment, the threshold size is a configuration parameter set by a user of the client computer.

Method 500 includes selecting 510 the source associated with the response that is received first. The action of selecting 510 the first source that responds to the establishment of a socket connection enables automatic selection of the download source having the fastest throughput speed.

Figure 6:
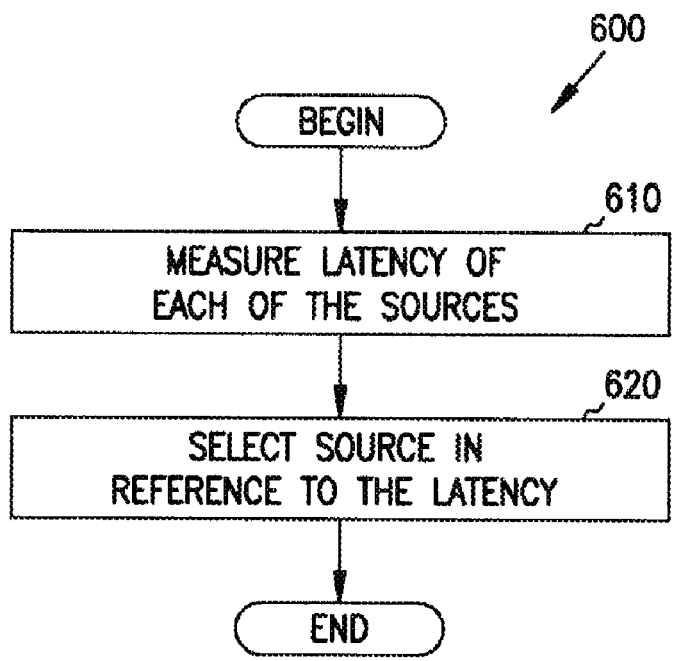
FIG. 6 is a flowchart of a method for selecting one of a plurality of download sources, as FIG. 4, in which a predetermined file size is not less than a predetermined threshold file size, performed by a client according to an embodiment of the invention.

FIG. 6 is a flowchart of a method 600 for selecting one of a plurality of download sources, as in action 440 in FIG. 4, in which a predetermined file size is not less than a predetermined threshold file size, performed by a client according to an embodiment of the invention.

Method 600 includes measuring 610 the latency of each of the plurality of download sources. The action of measuring 610 the latency of each source enables confirming verifying, testing or measuring the associated speed of download sources.

Subsequently, method 600 includes selecting 620 a source in reference to the latency of each of the plurality of download sources. Through the action of selecting 620 a source in reference to the latency of each of the plurality of download sources, method 600 enables automatic selection of the download source having the fastest throughput speed.

Figure 7:
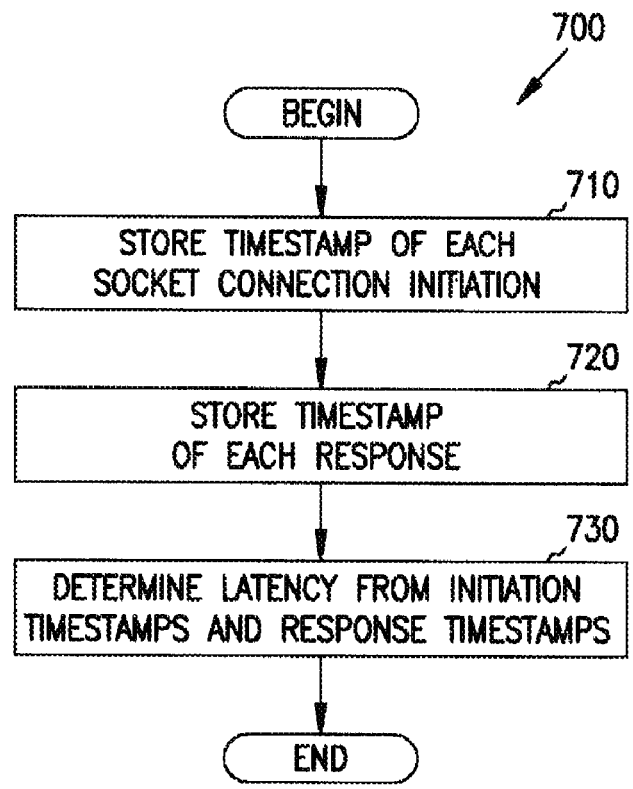
FIG. 7 is a flowchart of a method for measuring the latency, as FIG. 6, in which a predetermined file size is not less than a predetermined threshold file size, performed by a client according to an embodiment of the invention.

FIG. 7 is a flowchart of a method 700 for measuring the latency, as in action 610 in FIG. 6, in which a predetermined file size is not less than a predetermined threshold file size, performed by a client according to an embodiment of the invention.

Method 700 includes storing 710 a timestamp of each of the plurality of initiating socket connections. A timestamp includes a time, and optionally, a date. One example of an initiating socket call is a SYN message. Thereafter, method 700 includes storing 720 a timestamp of each of the plurality of responses. One example of a response is an ACK message. Subsequently, method 700 includes determining 730 the latency of each of the plurality of sources from the differences between the time and date of each of the plurality of responses, that are stored in action 720, and the time and date of each of the plurality of initiating socket connections that are stored in action 710.

Method 700 enables confirming, verifying, testing or measuring the associated speed of download sources.

Figure 8:
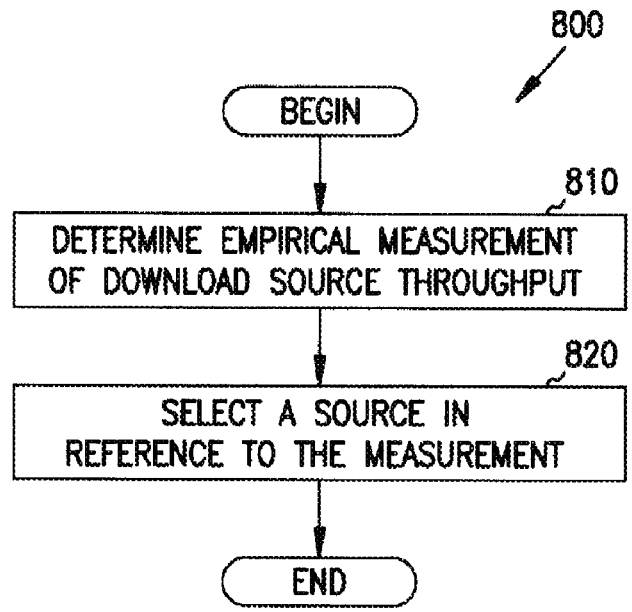
FIG. 8 is a flowchart of a method for managing a plurality of download sources, performed by a client according to an embodiment of the invention.

FIG. 8 is a flowchart of a method 800 for managing a plurality of download sources, performed by a client according to an embodiment of the invention.

Method 800 includes determining 810 an empirical measurement of a throughput speed of each of the plurality of download sources. In one example, action 810 is performed by the source throughput performance measurer 205 in FIG. 2. In another example, action 810 is performed by the source throughput empirical performance measurer 1005 in FIG. 10. Examples of download sources include source-1 1015, source-2 1020, and source-n 1025 in FIG. 10. In another embodiment, identifications of the download sources, such as an Internet Protocol (IP) address, of the download sources are received through the list of sources, such as the list of sources 210 in FIG. 2 or the list of sources 1010 in FIG. 10. In yet another embodiment of method 800, throughput speed is a download speed. Determining 810 the empirical measurement of a throughput speed of each of the plurality of download sources enables confirming, verifying, testing or measuring the associated speed of download sources.

The empirical measurement can be determined from a number of sources. In varying embodiments, such as one or more third party sources, a local source, or by direct measurement. A third-party source is a source operated by a party other than the party is operating the apparatus, system or method of the present invention. Where the source is a third party source, the third-party source has previously determined and stored the empirical measurement of the throughput. In this embodiment, determining the empirical measurement includes obtaining an empirical measurement of a throughput speed of each of the plurality of download sources from one or more third-party sources. Where the source is a local source, a local process has previously determined and stored the empirical measurement of the throughput. In this embodiment, the determining 810 includes obtaining an empirical measurement of a throughput speed of each of the plurality of download sources from a local source. In one example, the empirical measurement is stored on persistent storage 1065 in FIG. 10. Where the source of the empirical measurement is direct measurement, the empirical measurement is performed in a substantially real time manner and the determining includes measuring a throughput speed of each of the plurality of download sources.

The empirical measurement for each source is calculated from the time difference between a test message that is transmitted to each source, and a response to the test message that is received from each source. The time difference is the elapsed time. Examples of test messages are such as test-1 1030, test-2 1035, and test-n 1040 in FIG. 10, Examples of responses include response1 1045, response2 1050, and response-n 1055 in FIG. 10. Measuring the elapsed time difference is described further in FIG. 9.

Thereafter, method 800 includes selecting 820 a source in reference to the empirical measurement of the throughput speed of each of the plurality of download sources. In one example, action 820 in performed by source selector 270 in FIG. 2. In another example, action 820 in performed by source selector 1070 in FIG. 10. Examples of a selected source include the selected source 275 in FIG. 2 and the selected source 1075 in FIG. 10. In varying embodiments, a source is selected in reference to the empirical measurements which can include round trip time, packet loss, past results, number of other people connected to the source, security/encryption of the source, and trustworthiness of the source. The action of selecting 820 a source in reference to the empirical measurement enable automatica selection of the download source having the fastest throughput speed.

Figure 9:
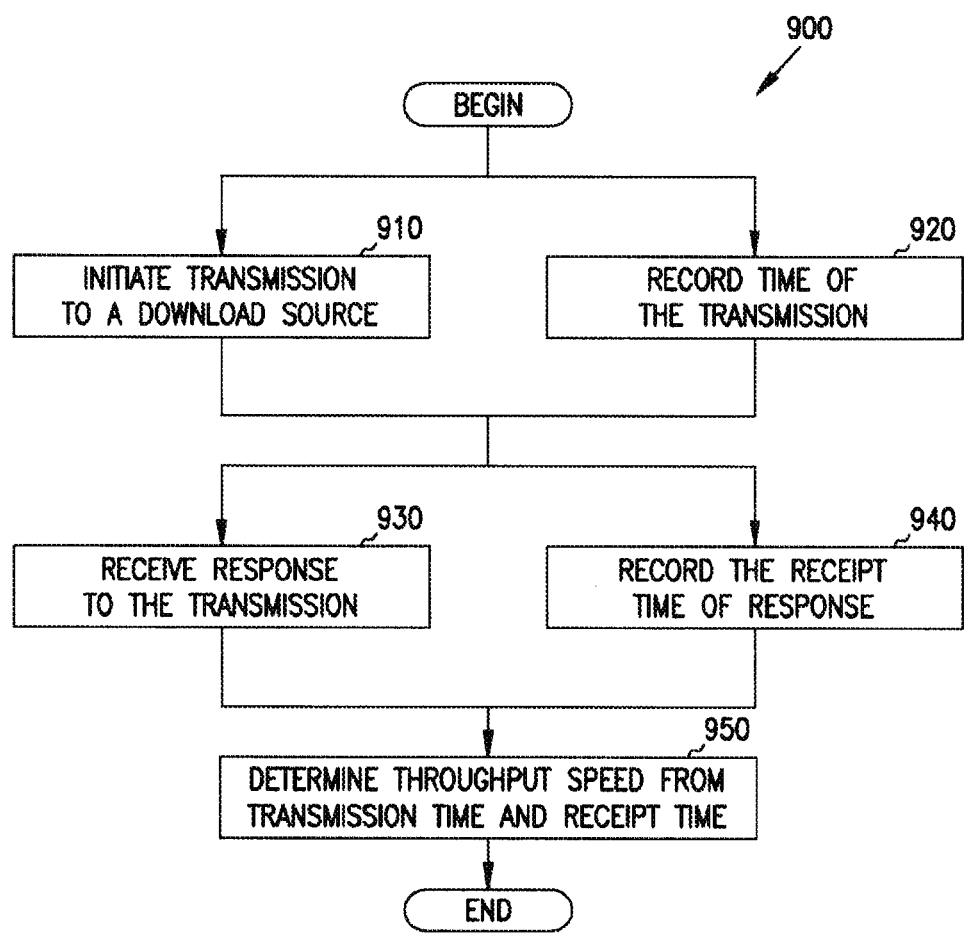
FIG. 9 is a flowchart of a method for measuring the elapsed time of a transmission involving each of the plurality of download sources of FIG. 8, performed by a client according to an embodiment of the invention.

FIG. 9 is a flowchart of a method 900 for measuring the elapsed time of a transmission involving each of the plurality of download sources, as in action 810 of FIG. 8, performed according to an embodiment of the invention.

Method 900 includes initiating 910 a transmission to a download source of the plurality of download sources. Examples of transmission include test-1 1030, test-2 1035, and test-n 1040 in FIG. 10. Examples of download sources include source-1 1015, source-2 1020, and source-n 1025 in FIG. 10.

Method 900 includes recording 920 the time of transmission. The time is the current time and date as indicated by the processor, such as processor 118 in FIG. 1.

Thereafter, method 900 also includes receiving 930 a response to the transmission from the download source. Examples of responses include a response response1 1045, response2, 1050, and response-n 1055 in FIG. 10.

Method 900 also includes recording 940 the receipt time from the current date and time.

Subsequently, method 900 includes determining 950 the throughput speed of the download source from the difference between the receipt time and the transmission time. The receipt time is subtracted from the transmission time, yielding the total throughput time. Where the size of the transmission and response is equal for each source tested, the throughput time can be used as a proxy for the throughput speed without further computation. However, in another embodiment, where the size of the transmission and response is not equal for each source tested, the throughput time must be divided into the transmission size for each source in order to determine the throughput speed for each source.

In one embodiment, methods 300-900 are implemented as a computer data signal embodied in a carrier wave, that represents a sequence of instructions which, when executed by a processor, such as processor 118 in FIG. 1, cause the processor to perform the respective method.

In another embodiment, methods 300-900 are implemented on a computer-accessible medium having executable instructions capable of directing a processor, such as processor 118 in FIG. 1, to perform the respective method.

Apparatus Implementation

Figure 10:
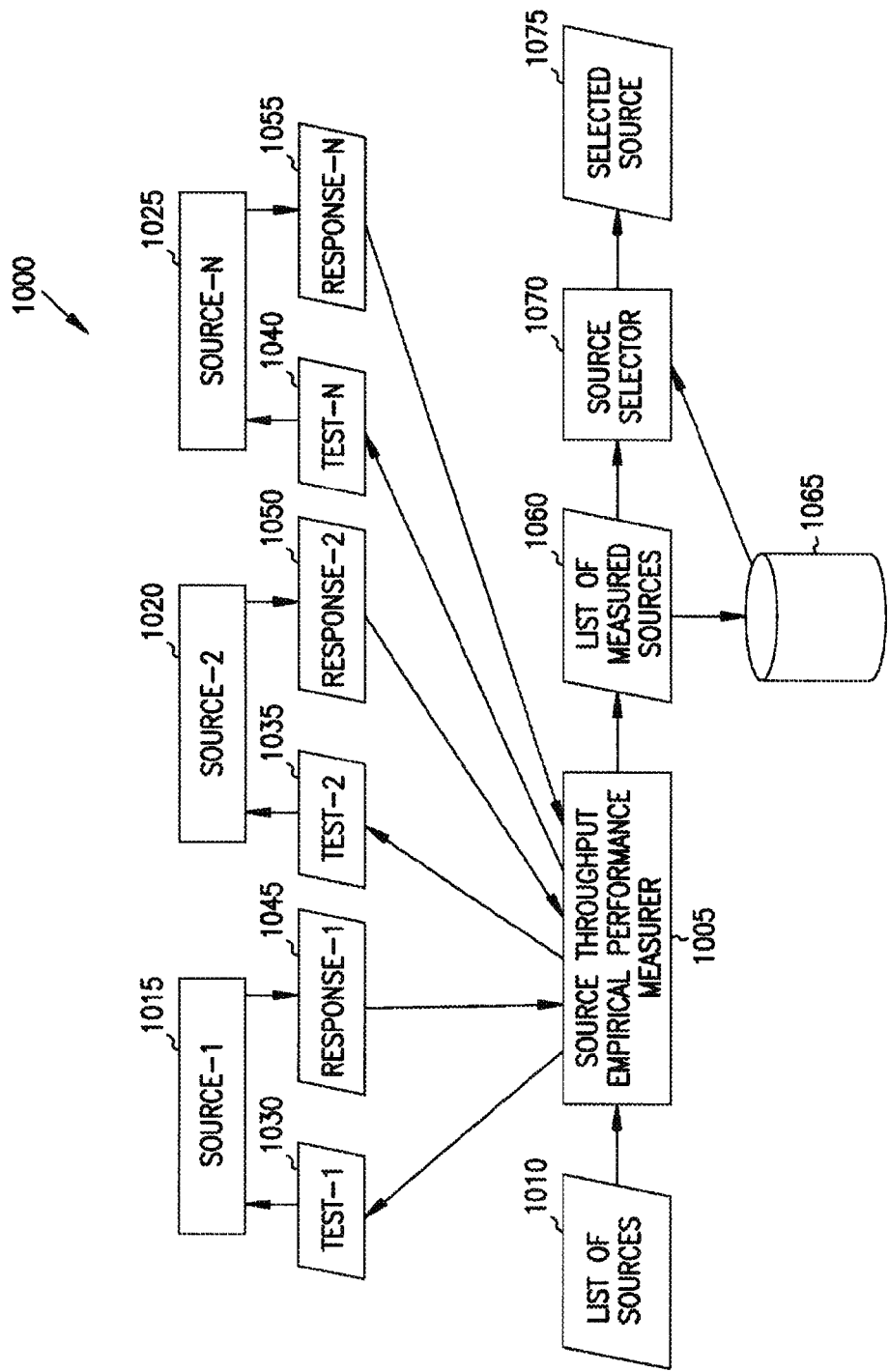
FIG. 10 is a block diagram of an apparatus for managing a plurality of download sources, according to an embodiment of the invention.
Figure 11:
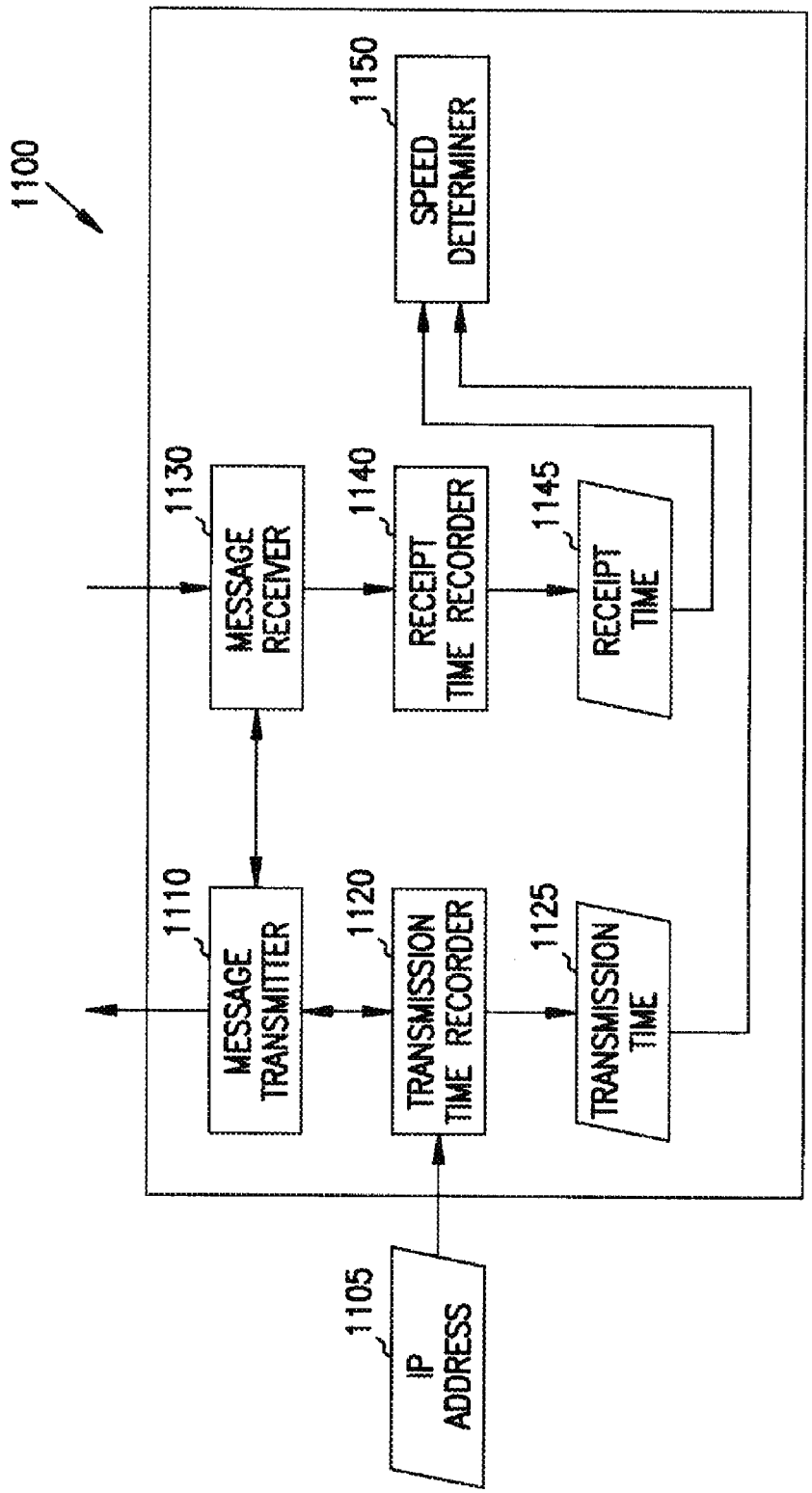
FIG. 11 is a block diagram of a source throughput empirical performance measurer, according to an embodiment of the invention.

Referring to FIGS. 10-11, a particular implementation of the invention is described in conjunction with the system overview in FIG. 2 and the methods described in conjunction with FIGS. 3-9.

FIG. 10 is a block diagram of an apparatus 1000 for managing a plurality of download sources, according to an embodiment of the invention.

Apparatus 1000 includes a source throughput empirical performance measurer 1005. The source throughput empirical performance measurer 1005 receives a list of sources 1010. The list of sources 1010 identifies sources, such as source-1 1015, source-2 1020, and source-n 1025, that have been determined as a source of a data file (not shown). The data file is identical on each of the sources. The source throughput empirical performance measurer 1005 transmits test data, such as test-1 1030, test-2 1035, and test-n 1040, to each of the sources. Each source responds by transmitting a response, such as response1 1045, response2, 1050, and response-n 1055. The source throughput empirical performance measurer 1005 receives the responses, and measures the elapsed time between the transmittal of the test data, and corresponding response. The list of sources 1010 is modified to indicate the performance measurements, yielding a list of measured sources 1060. The source throughput empirical performance measurer 1005 enables confirming, verifying, testing or measuring the associated speed of download sources. In one embodiment, the list of measured sources 1060 is stored in persistent storage 1065 for future reference.

The list of measured sources 1060 is then transmitted to a source selector 1070 that selects a source 1075 from the list of measured source 1060 in reference to the performance measurements. The source selector 1070 selecting a source 1075 from the list of measured source 1060 in reference to the performance measurements enables apparatus 1000 to automatically select the download source having the fastest throughput speed.

A downloader (not shown) initiates a download of the data file from the source indicated by the selected source 1075.

FIG. 11 is a block diagram of a source throughput empirical performance measurer 1100, according to an embodiment of the invention. The source throughput empirical performance measurer 1100 is one embodiment of the source throughput empirical performance measurer 1005, shown in FIG. 10.

The measurer 1100 includes a transmitter 1110 of a message to a download source. The transmitter 1110 receives an Internet protocol (IP) address 1105 of the download source. The download source is one of the plurality of download sources.

The measurer 1100 also includes a recorder 1120 of the time 1125 of a transmission of a message. The recorder 1120 is operably coupled to the transmitter 1110. In one embodiment, the message further comprises a TCP/IP synchronized idle (SYN) message.

The measurer 1100 also includes a receiver 1130 of a response to the transmission from the download source. The receiver 1130 is operably coupled to the transmitter 1110. In one embodiment, the response further comprises a TCP/IP acknowledgment (ACK) message.

The measurer 1100 also includes a recorder 1140 of the time 1145 of receipt of the response.

The measurer 1100 also includes a determiner 1150 of the throughput speed of the download source. The speed is determined from the difference between the receipt time 1145 and the transmission time 1125.

The apparatus 1000 component of the source throughput empirical performance measurer 1005, and the apparatus 1100 components of the source selector 1070, transmitter 1110, recorder 1120, receiver 1130, recorder 1140, and determiner 1150 can be embodied as computer hardware circuitry or as a computer-readable program, or a combination of both. In another embodiment, the source throughput empirical performance measurer 1005, and the apparatus 1100 components of the source selector 1070, transmitter 1110, recorder 1120, receiver 1130, recorder 1140, and determiner 1150 are implemented in an application service provider (ASP) apparatus.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

TCP/IP Ethernet Implementation

In one embodiment of the present invention, communications with the sources are implemented using TCP/IP.

Figure 12:
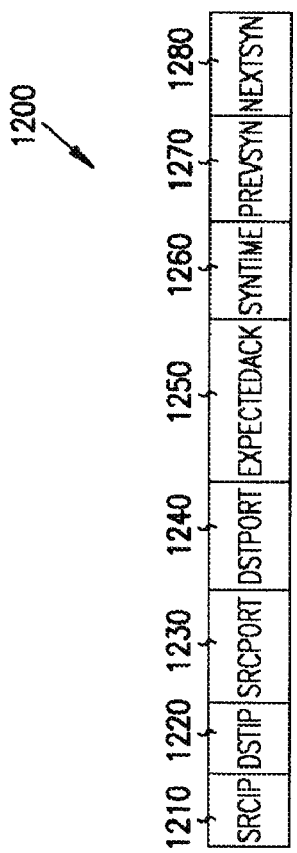
FIG. 12 is a block diagram of a data structure implemented in the management of outstanding synchronous idle and acknowledgment messages in transmission control protocol/Internet protocol.

FIG. 12 is a block diagram of a data structure 1200 implemented in the management of outstanding synchronous idle (SYN) and acknowledgment (ACK) messages in transmission control protocol/Internet protocol (TCP/IP). Data structure 1200 is used in action 360 of method 300, action 610 of method 600, action 730 of method 700, and in all parts of apparatus 1100 used to measure latency.

Data structure 1200 includes fields storing data representing a source IP address (SrcIP) 1210, a destination IP (DstIP) address 1220, a source port (SrcPort) address 1230, a destination port (DstPort) address 1240, an expected acknowledgement (ExpectedAck) indicator 1250, a synchronous idle time (SynTime) indicator 1260, a pointer to a previous outstanding synchronous idle data structure (PrevSyn) 1270, and a pointer to a subsequent outstanding synchronous idle data structure 1280 (NextSyn). In varying embodiments, the fields SrcIP, DstIP, SrcPort, DstPort, ExpectedAck, and SynTime are implemented as data types: unsigned long, unsigned long, unsigned short, unsigned short, unsigned long, respectively.

Figure 13:
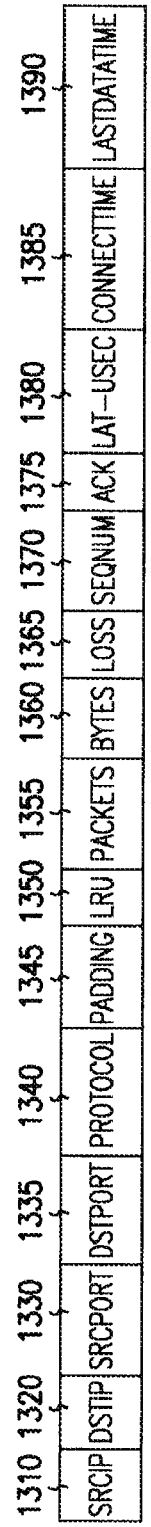
FIG. 13 is a block diagram of a data structure implemented in the management of global IP flow statistics.

FIG. 13 is a block diagram of a data structure 1300 implemented in the management of global IP flow statistics. Data structure 1300 is used in action 360 of method 300, action 610 of method 600, action 730 of method 700, and in all parts of apparatus 1100 used for measuring latency.

Data structure 1300 includes fields storing data representing source IP address (SrcIP) 1310, a destination IP (DstIP) address 1320, a source port (SrcPort) address 1330, and a destination port (DstPort) address 1335. The Source port (SrcPort) address 1330 the destination port (DstPort) address 1335 are generally used by the higher level protocols such as TCP and UDP). Data structure 1300 also includes a protocol 1340. Examples of protocol 1340 include TCP/IP, UDP and ICMP). Data structure 1300 further includes a padding 1345 of unused bytes to create a packet of an even multiple of 32 bits or 4 bytes. Data structure 1300 also includes least recently used (LRU) 1350, packets per second 1355 that indicates the number of packets that have accumulated since the last time it was sampled, bytes 1360 that represents the number of bytes that have accumulated since a prior sampling, loss 1365 that represents the number of packets lost, a sequence number (SeqNum) 1370, an acknowledgement (Ack) 1375, a measurement of latency in microseconds (Lat_uSec) 1380, a time when a socket connection was first made (connectTime) 1385, and a time when the socket was last used (LastDataTime) 1390. In varying embodiments, the SrcIP 1310, DstIP 1320, SrcPort 1330, DstPort 1335, protocol 1340, padding 1345, LRU 1350, packets 1355, bytes 1360, loss 1365, SeqNum 1370, Ack 1375, Lat_uSec 1380, connectTime 1385, and LastDataTime 1390 are implemented as data types: unsigned long, unsigned long, unsigned short, unsigned short, unsigned short, unsigned short, unsigned long, unsigned long, unsigned long, unsigned long, unsigned long, unsigned long, unsigned long, large integer, large integer; respectively.

Figure 14:
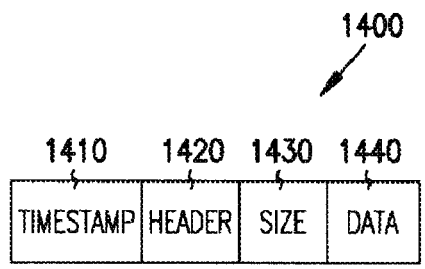
FIG. 14 is a block diagram of a data structure implemented in the management of Ethernet packet data from a network interface card driver.

FIG. 14 is a block diagram of a data structure 1400 implemented in the management of Ethernet packet data from a network interface card (NIC) driver. Data structure 1400 is used in action 205 of method 200, action 395 of method 300, action 810 of method 800, action 920, 930, and 940 of method 900, and in part 1005 of apparatus 1000 used for measuring throughput with associated timestamps and data.

Data structure 1400 includes fields storing data representing a timestamp 1410, header 1420, datasize (SIZE) 1430, and data 1440. In varying embodiments, the timestamp 1410, header 1420, datasize (SIZE) 1430, and data 1440 are implemented as data types: large integer, unsigned char header, unsigned long, and unsigned char; respectively.

Figure 15:
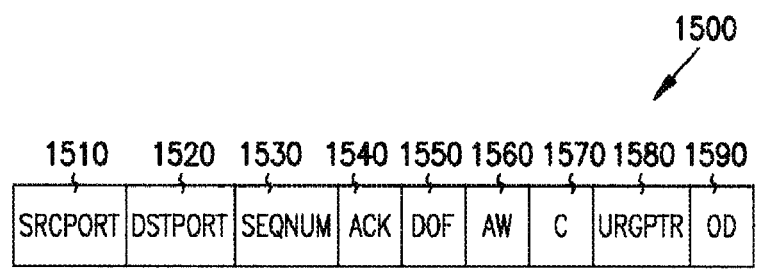
FIG. 15 is a block diagram of a data structure implemented in the management of Transmission Control Protocol (TCP) header information.
Figure 16:
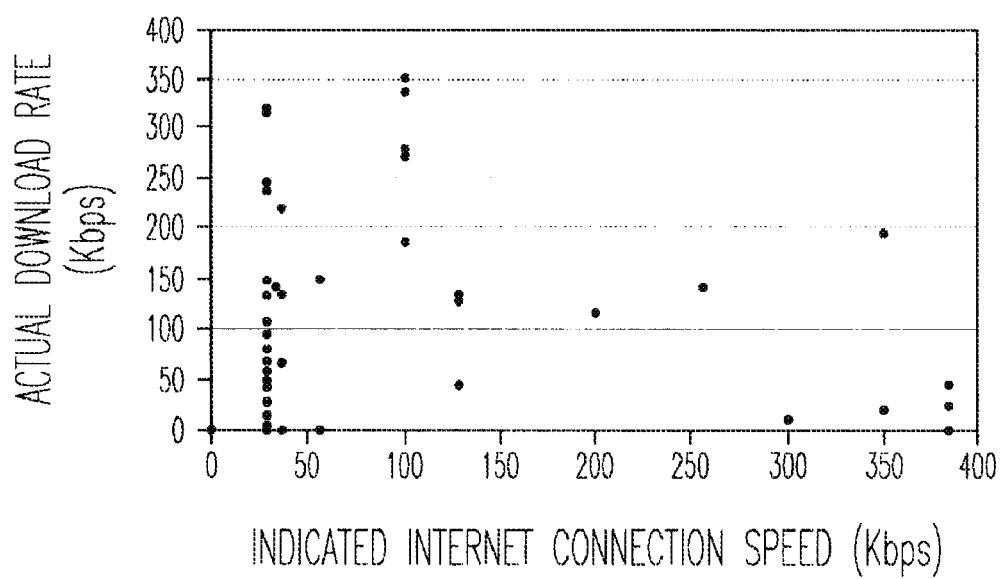
FIG. 16 is a graph illustrating various specified throughput speeds and the actual throughput speeds associated with the specified throughput speeds.

FIG. 15 is a block diagram of a data structure 1500 implemented in the management of TCP header information. Data structure 1500 is used in action 360 of method 300, action 610 of method 600, action 730 of method 700, and in all parts of apparatus 1100 used for measuring latency.

Data structure 1500 includes fields storing data representing a source port (SrcPort) 1510, a destination port (DstPort) 1520, a sequence number (SEQNUM) 1530, an acknowledgment (ACK) 1540, a DataOff flags (DOF) 1550 that represents the TCP header size in 4 byte quantities, an advertised window (AW) 1560 that represents the maximum number of bytes the sender is willing to accept, a checksum (C) 1570, an urgent pointer (UrgPtr) 1580 that represents a pointer to urgent data, and options data (OD) 1590 that represents and end-of-option list, No-Operation, or Maximum Segment Size. In varying embodiments, the SrcPort 1510, DstPort 1520, SEQNUM 1530, ACK 1540, DOF 1550, AW 1560, C 1570, UrgPtr 1580, and the OD 1590 are implemented as data types: unsigned short, unsigned short, unsigned long, unsigned long, unsigned short, unsigned short, unsigned short, unsigned short, unsigned char; respectively. Data Structure 1500 is a well known TCP data structure.

A system and method for automatic and adaptive use of active network performance measurement techniques to find the fastest source has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in procedural terms, one of ordinary skill in the art will appreciate that the invention can be implemented in an object-oriented design environment or any other design environment that provides the required relationships.

Systems and methods are provided through which automatic and adaptive use of active network performance measurement techniques identifies a fastest download source. Before a download source is selected, empirical measurements of the download speed are performed. For small files, the first source to acknowledge an open socket connection is used as an indication of the fastest download source. For large files, a test download is performed as the empirical measurement to determine the fastest download source.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The terminology used in this application with respect to is meant to include all database and communication environments and alternate technologies which provide the same functionality as described herein. Therefore, it is manifestly intended that this invention be limited only by the following claims and equivalents thereof.

We claim:

1. A method for managing a plurality of sources comprising:
    selecting a type of empirical measurement of performance from a plurality of types of empirical measurement, wherein the type of empirical measurement is selected according to a comparison of a size of data to be obtained from at least one of a plurality of sources with a threshold size;
    selecting a download source from the plurality of sources, the selection made according to empirical measurements of performance having the selected type for each of the plurality of sources; and
    initiating a download of data from the selected download source of the plurality of sources.

2. The method of claim 1, further comprising:
    obtaining an empirical measurement of performance of each of the plurality of sources from a local source.

3. The method of claim 1, wherein the performance further comprises a throughput speed.

4. The method of claim 1, wherein the performance comprises latency.

5. The method of claim 2, wherein obtaining the empirical measurement further comprises:
    measuring the elapsed time of a transmission involving each of the plurality of sources.

6. The method of claim 2, wherein obtaining the empirical measurement further comprises for each of the plurality of sources:
    recording transmission time from the current time and date;
    initiating a transmission to a download source of the plurality of sources;
    receiving a response to the transmission from the source;
    recording the receipt time from the current date and time; and
    determining the throughput speed of the source from the difference between the receipt time and the transmission time.

7. A non-transitory computer-readable storage medium having stored thereon executable instructions for managing a plurality of sources, said executable instructions capable of directing a processor to perform:
    selecting a type of empirical measurement of performance from a plurality of types of empirical measurement, wherein the type of empirical measurement is selected according to a comparison of a size of data to be obtained from at least one of a plurality of sources with a threshold size;
    selecting a download source in reference to the empirical measurements of the throughput speed of each of the plurality of sources; and
    initiating a download of data from a download source of the plurality of sources.

8. The non-transitory computer-readable storage medium of claim 7, wherein the throughput speed further comprises a download speed.

9. The non-transitory computer-readable storage medium of claim 7, wherein said instructions for selecting a type of empirical measurement further comprises an instruction capable of directing the processor to perform:
   measuring a throughput speed of each of the plurality of sources.

10. The non-transitory computer-readable storage medium of claim 9, wherein said instructions for measuring further comprises instructions capable of directing the processor to perform for each of the plurality of sources:
   recording transmission time from the current time and date;
   initiating a transmission to a download source of the plurality of sources;
   receiving a response to the transmission from the source;
   recording the receipt time from the current date and time; and
   determining the throughput speed of the source from the difference between the receipt time and the transmission time.

11. The non-transitory computer-readable storage medium of claim 7, wherein the download source further comprises a source in a peer-to-peer network.

12. The non-transitory computer-readable storage medium of claim 7, wherein said instructions for selecting a type of empirical measurement further comprises instructions capable of directing the processor to perform:
   recording transmission time from the current time and date;
   initiating a transmission to a download source of the plurality of sources;
   receiving a response to the transmission from the source;
   recording the receipt time from the current date and time; and
   determining the round-trip timing of the download source from the difference between the receipt time of the response and the transmission time of the transmission.

13. A computerized method for managing a plurality of sources comprising:
   obtaining a list comprising a plurality of identification of sources;
   initiating a plurality of socket connections, the plurality of socket connections further comprising one socket connection for each of the plurality of sources, yielding a plurality of initiated socket connections;
   selecting a type from a plurality of types of empirical measurement of performance of each of the plurality of sources, the type of empirical measurement selected according to a comparison of a predetermined file size with a predetermined threshold file size;
   receiving a response for the each of the plurality of initiated socket connections, yielding a plurality of responses;
   selecting a download source of the plurality of sources in reference to an empirical measurement of performance having the selected type; and
   initiating a download of data from the selected download source of the plurality of sources.

14. The computerized method of claim 13, wherein the predetermined file size is less than the predetermined threshold file size and wherein the type of empirical measurement of performance comprises a first response and wherein the selecting further comprises:
   selecting the source associated with the response that is received first.

15. The computerized method of claim 13, wherein the predetermined file size is greater than the predetermined threshold file size and wherein the type of empirical measurement of performance comprises a latency and wherein the selecting further comprises:
   measuring the latency of each of the plurality of sources; and
   selecting a source in reference to the download speed of each of the plurality of sources.

16. The computerized method of claim 15, wherein measuring the latency further comprises:
   storing a time and date of each of the plurality of initiating socket connections;
   storing the time and date of each of the plurality of responses; and
   determining the download speed of each of the plurality of sources from the differences in time between the time and date of each of the plurality of the responses and the time and date of each of the plurality of the initiating socket connections.

17. A system for managing sources in a peer-to-peer network comprising:
   a hardware processor;
   software means operative on the processor for selecting a type of empirical measurement of a plurality of types of measurements of throughput speed of each of the plurality of sources, the type of empirical measurement selected according to a comparison of a size of data to be obtained from at least one of the plurality of sources with a threshold size;
   the software means including obtainer means to obtain an empirical measurement having the selected type, the empirical measurement comprising of a throughput speed of each of the plurality of sources from at least one third-party source;
   the software means selecting a download source in reference to the empirical measurements of the throughput speed having the selected type for each of the plurality of sources and the at least one third-party source; and
   a transmitter to initiate a download of data from the download source of the plurality of sources.

18. The system of claim 17, wherein the throughput speed further comprises a round-trip time.

19. The system of claim 17, wherein the throughput speed further comprises a latency.

20. A computerized system comprising:
   a hardware processor;
   a determiner of empirical measurements of a throughput speed of each of a plurality of download peer-to-peer network sources, the empirical measurements having a type;
   the determiner operable to select a type of empirical measurement and to select an empirical measurement of a throughput speed having the selected type for each of the plurality of sources from at least one third-party source, the type of empirical measurement selected according to a comparison of a size of data to be obtained from at least one of the plurality of download peer-to-peer network sources with a threshold size;
   a selector of a download source in reference to the empirical measurement of the throughput speed of each of the plurality of peer-to-peer network sources and the at least one third-party source; and
   a transmitter to initiate a download of data from the download source of the plurality of peer-to-peer network sources.

21. The computerized system of claim 20, the determiner further comprising:

a transmitter to transmit a message to a download source of the plurality of sources;

a recorder of the time of a transmission of a message, operably coupled to the transmitter;

a receiver of a response to the transmission from the source, operably coupled to the transmitter;

a recorder of the time of receipt of a response; and a determiner of the throughput speed of the source, from the difference between the receipt time and the transmission time.

22. The computerized system of claim 20, wherein:

the message further comprises a TCP/IP synchronized idle message; and the response further comprises a TCP/IP acknowledgment message.

23. The method of claim 1, wherein the threshold size is determined according to a communications bandwidth of a computer system initiating the download of data.

24. The non-transitory computer-readable storage medium of claim 7, wherein the threshold size is determined according to a communications bandwidth of a computer system initiating the download of data.

25. The computerized method of claim 13, wherein the predetermined threshold file size is determined according to a communications bandwidth of a computer system initiating the download of data.

26. The system of claim 17, wherein the threshold size is determined according to a communications bandwidth of the system.

27. The computerized system of claim 20, wherein the threshold size is determined according to a communications bandwidth of the computerized system.

\* \* \* \* \*